United States Patent
Forti et al.

(10) Patent No.: US 10,968,931 B1
(45) Date of Patent: Apr. 6, 2021

(54) DUAL COMPONENT SEALING FASTENER AND COUPLING ASSEMBLY INCLUDING SAME

(71) Applicant: Newfrey LLC, New Britain, CT (US)

(72) Inventors: Adam A. Forti, Troy, MI (US); Oday Amer Safry, Farmington Hills, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/656,321

(22) Filed: Oct. 17, 2019

(51) Int. Cl.
*F16B 5/06* (2006.01)
*F16B 2/22* (2006.01)
*F16B 21/07* (2006.01)

(52) U.S. Cl.
CPC .............. *F16B 5/0664* (2013.01); *F16B 2/22* (2013.01); *F16B 5/065* (2013.01); *F16B 21/075* (2013.01)

(58) Field of Classification Search
CPC .......... F16B 5/0664; F16B 2/22; F16B 5/065; F16B 21/075; Y10T 24/303; Y10T 24/304; Y10T 24/306; Y10T 24/307; Y10T 24/309
See application file for complete search history.

(56) References Cited

U.S. PATENT DOCUMENTS

| | | | |
|---|---|---|---|
| 5,533,237 A | 7/1996 | Higgins | |
| 6,244,805 B1 | 6/2001 | Everard | |
| 6,279,207 B1 | 8/2001 | Vassiliou | |
| 6,353,981 B1 | 3/2002 | Smith | |
| 6,381,811 B2 | 5/2002 | Smith et al. | |
| 6,449,814 B1 | 9/2002 | Dinsmore et al. | |
| 6,474,616 B2 | 11/2002 | Yamada et al. | |
| 6,497,011 B2 | 12/2002 | Smith et al. | |
| 6,527,471 B2 | 3/2003 | Smith et al. | |
| 6,648,542 B2 | 11/2003 | Smith et al. | |

(Continued)

FOREIGN PATENT DOCUMENTS

| | | |
|---|---|---|
| FR | 3028577 B1 | 5/2016 |
| WO | WO-2018/080610 A1 | 5/2018 |

OTHER PUBLICATIONS

Fastener Assembly drawing, Part #13772 (1989).

(Continued)

*Primary Examiner* — Robert Sandy
(74) *Attorney, Agent, or Firm* — Harness, Dickey & Pierce, P.L.C.

(57) ABSTRACT

A U-base clip component can include two opposing side walls joined together at an insertion end with a rib receiving cavity between the two opposing side walls. Aperture retention arms can extend outwardly from the two opposing side walls, respectively. Rib coupling arms can extend inwardly from the two opposing side walls. A seal component can include a central wall having a clip aperture therethrough. A first component annular seal can extend in a first direction away from a first side of the central wall. A second component annular seal can extend in a second, opposite direction away from a second, opposite side of the central wall. The seal component and the U-base clip component can have a shipping configuration in which the U-base clip component extends through the clip aperture with the seal component coupled between the trailing end and the aperture retention arms of the U-base clip component.

25 Claims, 6 Drawing Sheets

(56) References Cited

U.S. PATENT DOCUMENTS

| | | |
|---|---|---|
| 6,665,914 B2 | 12/2003 | Ogawa |
| 6,718,599 B2 | 4/2004 | Dickinson et al. |
| 6,796,006 B2 | 9/2004 | Hansen |
| 6,846,125 B2 | 1/2005 | Smith et al. |
| 6,928,705 B2 | 8/2005 | Osterland et al. |
| 7,051,408 B2 | 5/2006 | De Azevedo et al. |
| 7,096,638 B2 | 8/2006 | Osterland et al. |
| 7,120,971 B2 | 10/2006 | Osterland et al. |
| 7,134,170 B2 | 11/2006 | Gibbons et al. |
| 7,186,051 B2 | 3/2007 | Benedetti et al. |
| 7,188,392 B2 | 3/2007 | Giugliano et al. |
| 7,204,000 B2 | 4/2007 | Benedetti et al. |
| 7,231,696 B2 | 6/2007 | Asano et al. |
| 7,272,873 B2 | 9/2007 | Nessel et al. |
| 7,287,945 B2 | 10/2007 | Lubera et al. |
| 7,356,886 B2 | 4/2008 | Okada |
| 7,364,382 B2 | 4/2008 | Benedetti et al. |
| 7,399,151 B2 | 7/2008 | Lubera et al. |
| 7,640,634 B2 | 1/2010 | Vassiliou |
| 7,725,991 B2 | 6/2010 | Lubera et al. |
| 7,740,432 B2 | 6/2010 | Harada |
| 7,784,159 B2 | 8/2010 | Dickinson et al. |
| 7,862,273 B2 | 1/2011 | Ooyama et al. |
| 8,051,539 B2 | 11/2011 | Benedetti et al. |
| 8,528,295 B2 | 9/2013 | Glynn et al. |
| 8,567,017 B2 | 10/2013 | Iwahara et al. |
| 8,627,552 B2 | 1/2014 | Smith et al. |
| 8,793,845 B2 | 8/2014 | Benedetti et al. |
| 8,904,607 B2 | 12/2014 | Diez Herrera |
| 8,950,043 B2 | 2/2015 | Hofmann et al. |
| 9,003,616 B2 | 4/2015 | Choi |
| 9,080,588 B2 | 7/2015 | Diez Herrera et al. |
| 9,630,572 B2 | 4/2017 | Iwahara et al. |
| 9,649,993 B1 | 5/2017 | Dickinson et al. |
| 9,981,614 B2 | 5/2018 | Mingerink et al. |
| 10,030,684 B2 | 7/2018 | Paquet |
| 10,227,025 B2 | 3/2019 | Tamai et al. |
| 10,288,098 B2 | 5/2019 | Meyers et al. |
| 10,336,265 B2 | 7/2019 | Dickinson et al. |
| 2002/0017009 A1 | 2/2002 | Smith et al. |
| 2005/0105987 A1 | 5/2005 | Giugliano et al. |
| 2012/0311829 A1 | 12/2012 | Dickinson et al. |
| 2013/0340216 A1 | 12/2013 | Smith et al. |
| 2015/0076304 A1 | 3/2015 | Hattori |
| 2015/0211565 A1 | 7/2015 | Benedetti |
| 2015/0321622 A1* | 11/2015 | Dickinson ............ F16B 21/075 24/458 |
| 2019/0017527 A1 | 1/2019 | Dickinson |
| 2019/0048907 A1 | 2/2019 | Sugiyama |
| 2019/0048911 A1 | 2/2019 | Bidlake et al. |
| 2019/0111857 A1 | 4/2019 | Benedetti et al. |
| 2019/0170178 A1 | 6/2019 | Leverger et al. |
| 2019/0195262 A1 | 6/2019 | Iwahara et al. |

OTHER PUBLICATIONS

Fastener Assembly drawing, Part #14788 (1992).
Fastener Assembly drawing, Part #14789 (1992).
Drawings of Stanley Engineered Fastening/Newfrey, Part # 72350-00, having a date of Apr. 15, 2019.
Drawings of Stanley Engineered Fastening/Newfrey, Part # 71975-00, having a date prior to Apr. 15, 2019 (typically combined with an inner metal clip).
Drawings of Stanley Engineered Fastening/Newfrey, Part # 71861-01, having a date of Jan. 20, 2017 (typically combined with an inner metal clip).
Drawings of Stanley Engineered Fastening/Newfrey, Part # X9081-C, having an unknown date.
Drawings of Stanley Engineered Fastening/Newfrey, Part # 71819-00, having a date prior to Jan. 20, 2017.
Drawings of Stanley Engineered Fastening/Newfrey, Part # 71198-00, having a date of Oct. 23, 2013.
Extended European Search Report in corresponding European Patent Application No. 20200208.5 dated Feb. 24, 2021.

* cited by examiner

DUAL COMPONENT SEALING FASTENER AND COUPLING ASSEMBLY INCLUDING SAME

FIELD

The present disclosure relates to dual component sealing fasteners designed to couple a first component having a rib to a second component having an aperture therethrough and coupling assemblies including same.

BACKGROUND

This section provides background information related to the present disclosure which is not necessarily prior art.

One type of sealing fastener designed to couple a first component having a rib to a second component having an aperture therethrough are referred to as bathtub fasteners. Such bathtub fasteners typically have a bathtub portion that seals around a specially-designed metal clip. The metal clip couples the rib to the interior of the bathtub. In turn, the bathtub is inserted into the aperture to seal the aperture and provide the coupling between the aperture and the metal clip. Among their disadvantages, such bathtub fasteners typically require a relatively large amount of space to implement, and have a relatively high cost to manufacture.

Another type of sealing fastener designed to couple a first component having a rib to a second component having an aperture therethrough are referred to as pour-over clips. Such pour-over clips typically have a liquid sealing material that is poured over the terminal end of the metal clip to form a planar seal element for sealing between the two components. Among their disadvantages, it is difficult to ensure the clip is centered so that an effective seal is formed against both the components, and pour-over material options are very limited.

SUMMARY

This section provides a general summary of the disclosure, and is not a comprehensive disclosure of its full scope or all of its features.

In accordance with one aspect of the present disclosure, a dual component sealing fastener designed to couple a first component having a rib to a second component having an aperture therethrough is provided. The dual component sealing fastener can include a U-base clip component and a seal component. The U-base clip component can include two opposing side walls joined together at an insertion end with a rib receiving cavity between the two opposing side walls. Each of the two opposing side walls can include a trailing end opposite the insertion end. A pair of aperture retention arms can extend outwardly from the two opposing side walls, respectively. A pair of rib coupling arms can extend inwardly from the two opposing side walls. The seal component can include a central wall having a clip aperture therethrough. A first component annular seal can extend in a first direction away from a first side of the central wall. A second component annular seal can extend in a second direction away from a second side of the central wall opposite the first direction and opposite the first side, respectively. The seal component and the U-base clip component can have a shipping configuration in which the U-base clip component extends through the clip aperture with the seal component coupled between the trailing end and the aperture retention arms of the U-base clip component.

In accordance with one aspect of the present disclosure a, dual component sealing fastener designed to couple a first component having a rib to a second component having an aperture therethrough is provided. The dual component sealing fastener can include a U-base clip component and a seal component. The U-base clip component can include two opposing side walls joined together at an insertion end with a rib receiving cavity between the two opposing side walls. Each of the two opposing side walls can include an outwardly extending flange at a trailing end opposite the insertion end. A pair of aperture retention arms can extend outwardly from the two opposing side walls, respectively. A pair of rib coupling arms can extend inwardly from the two opposing side walls. The seal component can include a central wall having a clip aperture therethrough. A first component annular seal can extend in a first direction away from a first side of the central wall. A second component annular seal can extend in a second direction away from a second side of the central wall opposite the first direction and opposite the first side, respectively. The seal component and the U-base clip component can have a shipping configuration in which the U-base clip component extends through the clip aperture and is coupled to the seal component with the outwardly extending flanges positioned adjacent a surface of the central wall of the seal component facing away from the insertion end. And in the shipping configuration, the aperture retention arms can be biased against the seal component with a free distal end of the aperture retention arms positioned adjacent a surface of the central wall of the seal component facing toward the insertion end.

In accordance with another aspect of the present invention, a coupling assembly can include a first component having a coupling rib and a first component sealing surface surrounding the coupling rib. A second component can have a coupling aperture therethrough and a second component sealing surface surrounding the coupling aperture. A seal component can include a central wall having a clip aperture therethrough. A first component annular seal can extend away from a trailing side of the central wall in a trailing direction. A second component annular seal can extend away from an insertion side opposite the trailing side of the central wall in an insertion direction opposite the trailing direction. A U-base clip component can include two opposing side walls joined together at an insertion end with a rib receiving cavity between the two opposing side walls. Each of the two opposing side walls can include a trailing end opposite the insertion end. A pair of aperture retention arms can extend outwardly from the two opposing side walls, respectively. A pair of rib coupling arms can extend inwardly from the two opposing side walls. The coupling assembly can have a coupling configuration in which the U-base clip component extends through the clip aperture of the seal component and through the coupling aperture of the first component with the aperture retention arms retaining the second component annular seal against the second component sealing surface. And in the coupling configuration, the coupling rib can extend into the rib receiving cavity with the rib coupling arms retaining the first component annular seal against the first component sealing surface. As a result, the first and second component sealing surfaces are sealed together around both the coupling aperture of the first component and the clip aperture of the sealing component in the coupling configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Referring to FIGS. 1-7, one example dual component sealing fastener 20 designed to couple a first component 22 having a coupling rib 24 to a second component 26 having a coupling aperture 28 therethrough in a coupling assembly in accordance with the present disclosure is described herein. The dual component sealing fastener 20 includes a U-base clip component 30 and a seal component 32.

Figure 1:
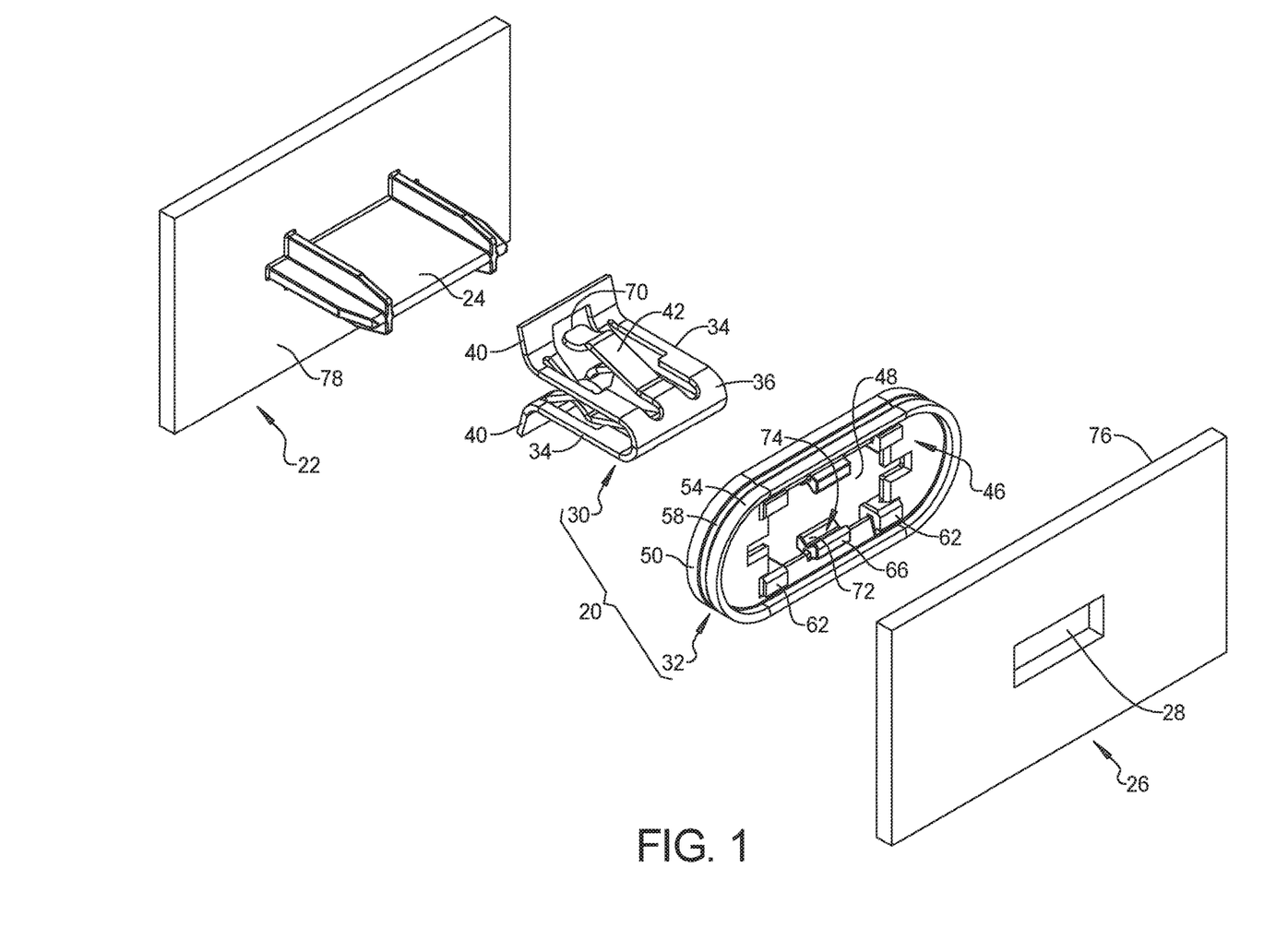
FIG. 1 is an exploded view of components of one example dual component sealing fastener, and of one example coupling assembly including a dual component sealing fastener, in accordance with the present disclosure.
Figure 2:
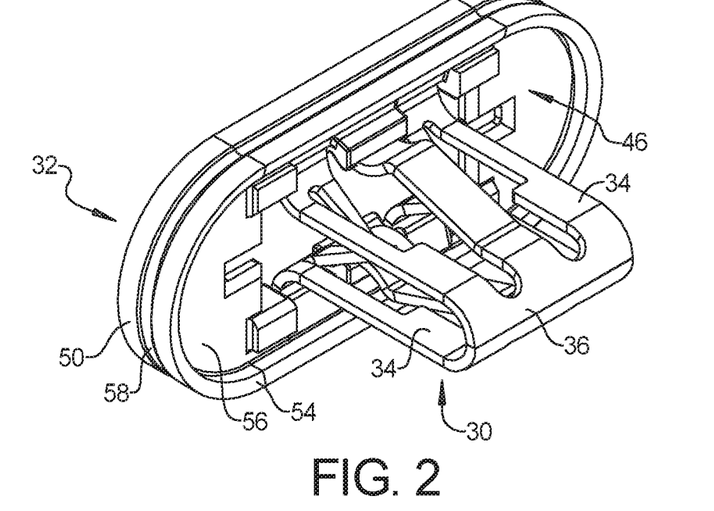
FIG. 2 is a perspective view of the dual component sealing fastener of FIG. 1 in a shipping configuration.
Figure 3:
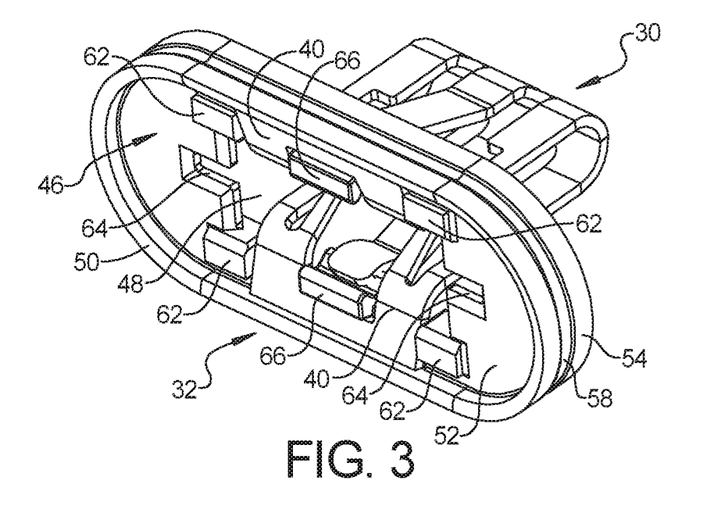
FIG. 3 is a perspective view of the dual component sealing fastener of FIG. 1 in a shipping configuration.
Figure 4:
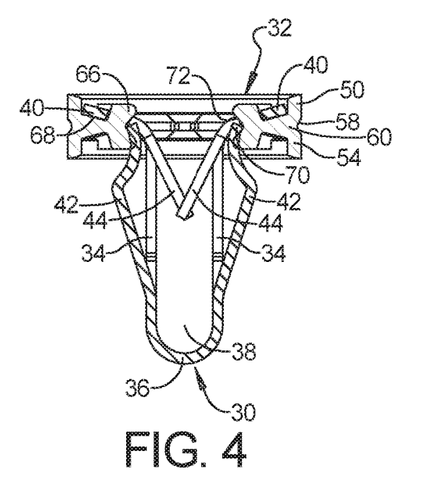
FIG. 4 is a cross-section view of the dual component sealing fastener of FIG. 1 in a shipping configuration.
Figure 5:
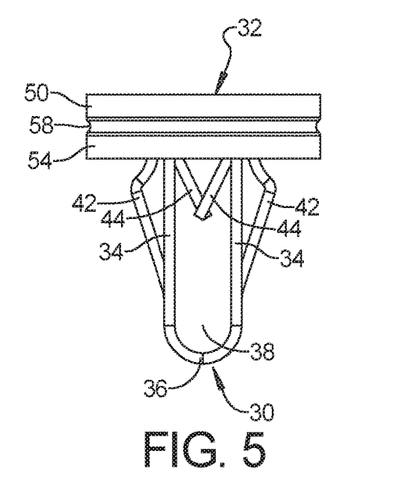
FIG. 5 is a lateral side elevation view of the dual component sealing fastener of FIG. 1 in a shipping configuration.

The U-base clip component 30 includes two opposing side walls 34 joined together at an insertion end 36 with a rib receiving cavity 38 between the two opposing side walls 34. Each of the two opposing side walls 34 includes a trailing end 40 that is opposite the insertion end 36. A pair of aperture retention arms 42 can extend outwardly from the two opposing side walls 34, respectively. Such aperture retention arms 42 are designed to couple the U-base clip component 30 to the second component 26 when the U-base clip component 30 is received within the coupling aperture 28 of the second component 26. A pair of rib coupling arms 44 can extend inwardly from the two opposing side walls 34. Such rib coupling arms 44 are designed to couple the U-base clip component 30 to the first component 22 when the coupling rib 24 of the first component 22 is received within the rib receiving cavity 38 of the U-base clip component 30. As in this embodiment, the rib coupling arms can be barbs 44.

The seal component 32 can include a central wall 46 having a clip receiving aperture 48 therethrough. A first component annular seal 50 can extend in a first direction away from a first side 52 of the central wall 46. Such a first component annular seal 50 is designed to seal against a surface of the first component 22 surrounding the coupling rib 24. A second component annular seal 54 can extend in a second direction away from a second side 56 of the central wall 46. The second direction and the second side 56 are opposite the first direction and opposite the first side 52, respectively.

When assembled together, the first side 52 is typically a side facing toward the trailing end 40 of the U-base clip component 30, away from the insertion end 36 of the U-base clip component 30, toward the first component 22, or away from the second component 26. Similarly, the first direction is typically a direction extending toward the trailing end 40 of the U-base clip component 30, away from the insertion end 36 of the U-base clip component 30, toward the first component 22, or away from the second component 26.

Conversely, when assembled together, the second side 56 is typically a side facing toward the insertion end 36 of the U-base clip component 30, away from the trailing end 40 of the U-base clip component 30, toward the second component 26, or away from the first component 22. Similarly, the second direction is typically a direction extending toward the insertion end 36 of the U-base clip component 30, away from the trailing end 40 of the U-base clip component 30, toward the second component 26, or away from the first component 22.

As in this example, the first component annular seal 50 and the second component annular seal 54 can both be part of a single piece component 60 (as indicated by the relevant cross-hatching of FIG. 4) formed of a seal material. An annular recess 58 can extend around the outside of the single piece component 60 between the first component annular seal 50 and the second component annular seal 54. In addition, the central wall 46 can also be part of the single piece component 60 (as indicated by the relevant cross-hatching of FIG. 4) formed of the seal material. The central wall 46 can include various positioning or strengthening protrusions 62 and positioning recesses 64 that can engage with one of the other components 30, 22, 26 when assembled together to strengthen the central wall 46 or facilitate proper positioning of the central wall 46 relative to the engaged other component 30, 22, 26, and vice versa.

The seal component 32 and the U-base clip component 30 can be coupled together in a shipping configuration shown in FIGS. 2-5. In this shipping configuration, the U-base clip component 30 can extend through the clip aperture 48 with the seal component 32 retained between the trailing end 40 and the aperture retention arms 42 of the U-base clip component 30. The trailing ends 40 of the U-base clip component 30 can prevent decoupling of the seal component 32 from the U-base clip component 30 in the trailing direction or away from the insertion end 36.

The trailing ends 40 can be hooked around a clip coupling protrusions 66, respectively, to resist decoupling of the seal component 32 from the U-base clip component 30 in the trailing direction or away from the insertion end. Additionally or alternatively, the trailing ends 40 can form outwardly extending flanges 40 that engage a coupling surface 68 of the first side 52 that faces toward the trailing end 40 or in the trailing direction, or away from the insertion end 36 to resist decoupling of the seal component 32 from the U-base clip component 30 in the trailing direction or away from the insertion direction.

In the shipping configuration, the pair of aperture retention arms 42 can be biased against the seal component 32 to resist decoupling of the seal component 32 and the U-base clip component 30 from each other. Additionally or alternatively, the pair of aperture retention arms 42 can resist decoupling of the seal component 32 from the U-base clip component 30 in the insertion direction or toward the insertion end 36. For example, a free distal end 70 of each aperture retention arm 42 can be positioned adjacent a surface 72 of the central wall 46 that faces toward the insertion end 36 of the U-base clip component 30 in the shipping configuration. A recess 74 can provide the surface 72 of the central wall 46 of the seal component 32 that faces toward the insertion end 36 of the U-base clip component 30 in the shipping configuration.

As in this example, the seal component can be symmetrical about a transverse central plane. Such a transverse central plane extends between the first component annular seal 50 and the second component annular seal 54. For example, the transverse central plane can extend down the middle of the annular recess 58 that extends around the outside of the single piece component 60 between the first component annular seal 50 and the second component annular seal 54. Similarly, the transverse central plane can extend down the middle of central wall 46 between the first side 52 and the second side 56.

Figure 6:
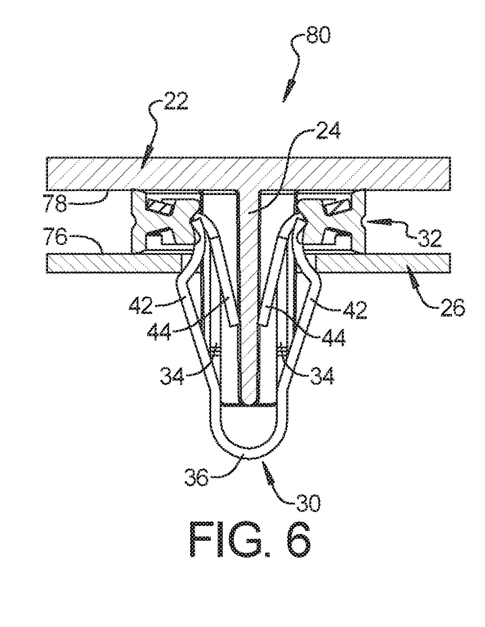
FIG. 6 is a cross-section view similar to FIG. 4 of the coupling assembly of FIG. 1 with the coupling assembly and the dual component sealing fastener in a shipping configuration.
Figure 7:
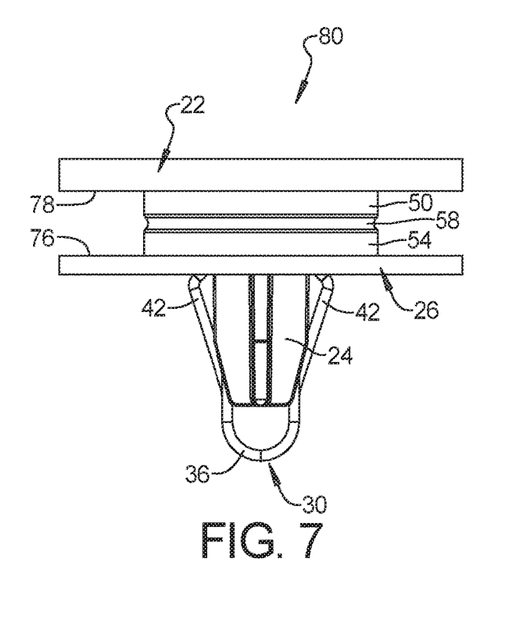
FIG. 7 is a lateral side elevation view similar to FIG. 5 of the coupling assembly of FIG. 1 with the coupling assembly and the dual component sealing fastener in a shipping configuration.
Figure 8:
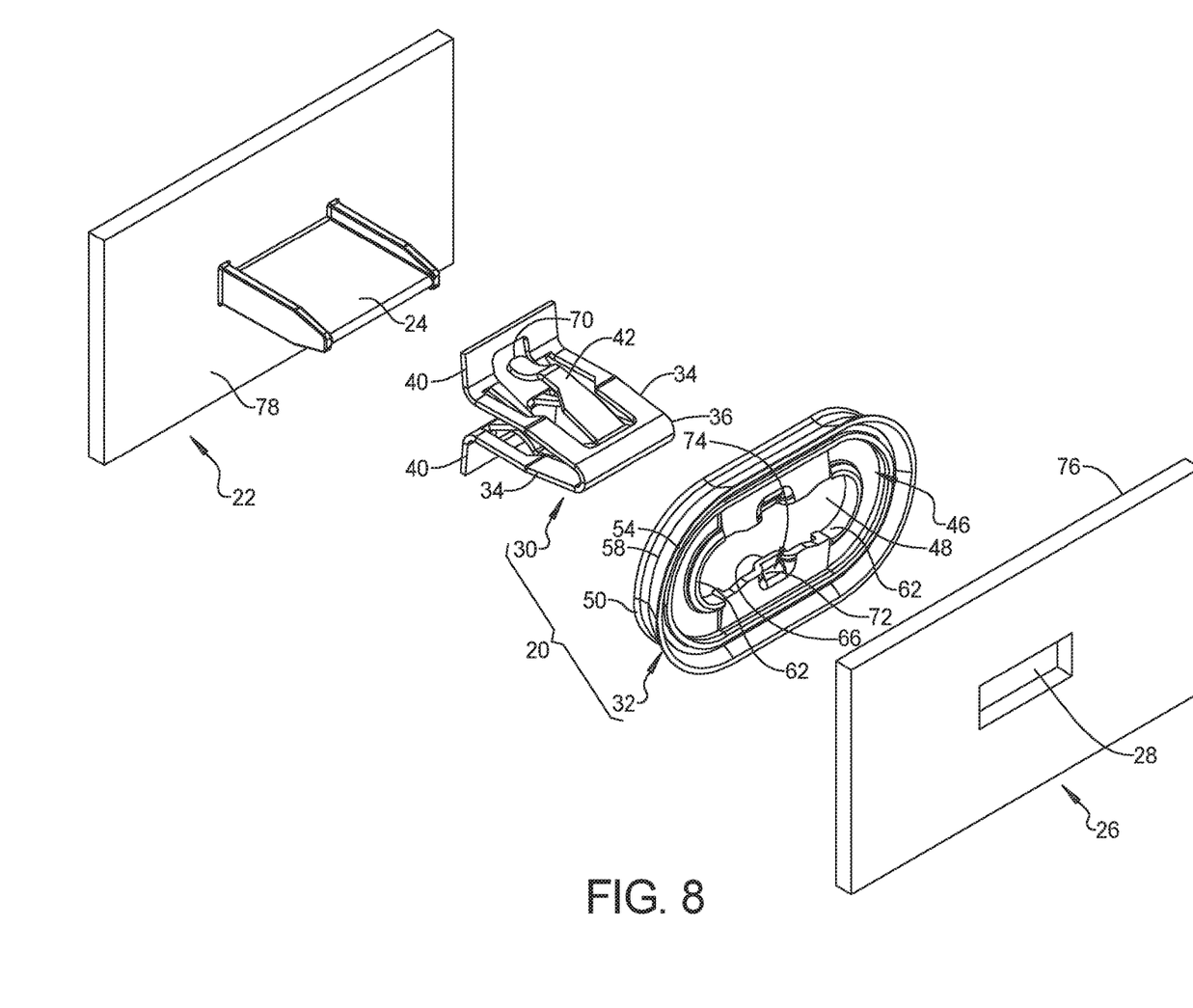
FIG. 8 is an exploded view of components of one example dual component sealing fastener, and of one example coupling assembly including a dual component sealing fastener, in accordance with the present disclosure.
Figure 9:
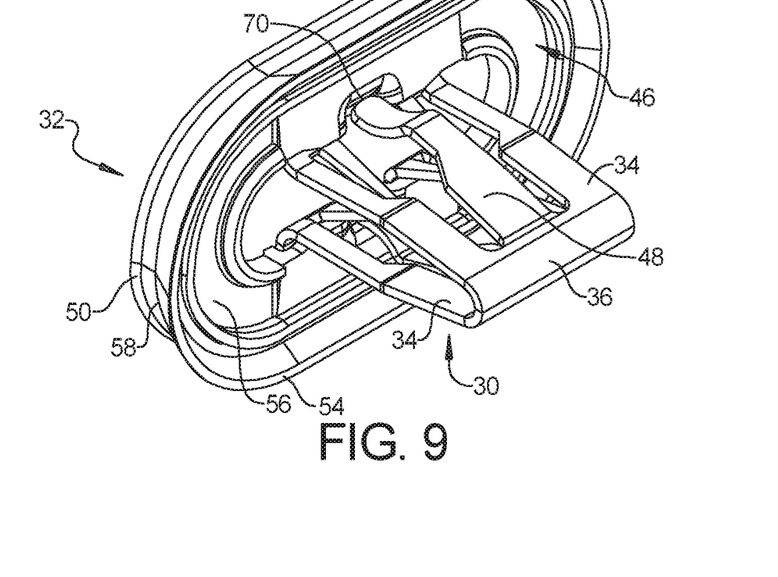
FIG. 9 is a perspective view of the dual component sealing fastener of FIG. 8 in a shipping configuration.
Figure 10:
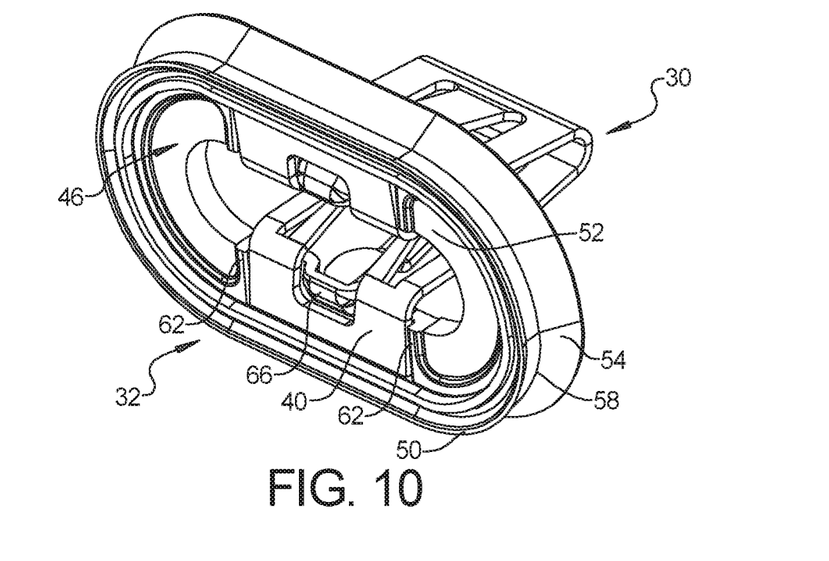
FIG. 10 is a perspective view of the dual component sealing fastener of FIG. 8 in a shipping configuration.
Figure 11:
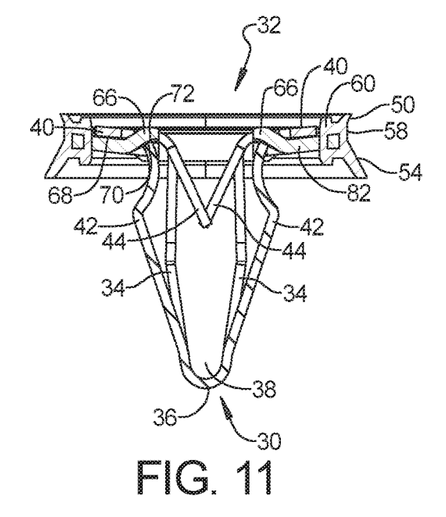
FIG. 11 is a cross-section view of the dual component sealing fastener of FIG. 8 in a shipping configuration.
Figure 12:
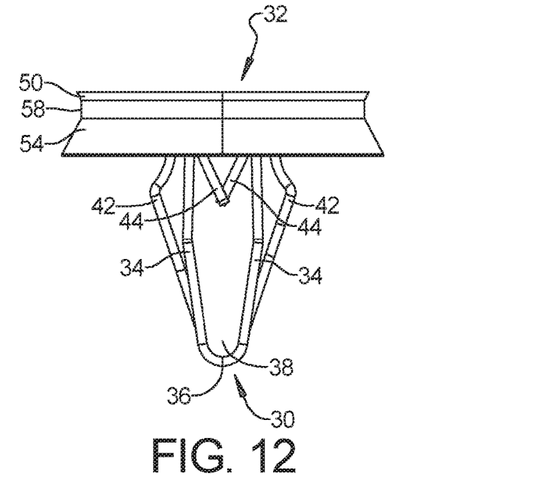
FIG. 12 is a lateral side elevation view of the dual component sealing fastener of FIG. 8 in a shipping configuration.

The dual component sealing fastener 20 can be a sub-assembly or part of a coupling assembly 80 having a coupling configuration in which the first component 22 is coupled to the second component 26 as shown in FIGS. 6 and 7. In this coupling configuration, the U-base clip component 30 can extend through the clip aperture 48 of the seal component 32 and through the coupling aperture 28 of the second component 26 with the aperture retention arms 42 retaining the second component annular seal 54 against a sealing surface 76 of the second component 26 surrounding the coupling aperture 28. The coupling rib 24 can extend into the rib receiving cavity 38 with the rib coupling arms 44 retaining the first component annular seal 50 against a sealing surface 78 of the first component 22 surrounding the coupling rib 24. As a result, the first component sealing surface 78 and the and second component sealing surface 76 can be sealed together around both the coupling aperture 28 of the second component 26 and the clip aperture 48 of the seal component 32.

Additionally or alternatively, the aperture retention arms 42 can be spaced from the seal component 32 in the coupling configuration as a result of the aperture retention arms 42 engaging the periphery of the coupling aperture 28 of the second component 26. Thus, the seal component 32 and the U-base clip component 30 can be designed to couple the first component 22 to the second component 26 in a coupling configuration in which the aperture retention arms 42 are biased against the second component 26 resulting in the aperture retention arms 42 being spaced away from the seal component 32.

Referring to FIGS. 8-14, another example dual component sealing fastener 20 designed to couple a first component 22 having a coupling rib 24 to a second component 26 having a coupling aperture 28 therethrough in a coupling assembly in accordance with the present disclosure is described herein. The same reference numbers are used herein to identify and describe corresponding elements or features in each of the various example embodiments of this disclosure, even if the corresponding elements or features are not identical. In addition, the descriptions of various corresponding elements or features previously provided may not be duplicated herein, despite its applicability to other example embodiments, to reduce or avoid unnecessary repetition thereof.

As in this example, the first component annular seal 50 and the second component annular seal 54 can both be part of a single piece component 60 (as indicated by the relevant cross-hatching of FIG. 11) formed of a seal material. An annular recess 58 can extend around the outside of the single piece component 60 between the first component annular seal 50 and the second component annular seal 54. In contrast, the central wall 46 can be a separate piece 82 from the single piece component 60, and can be formed of a harder material than the seal material, such as a plastic material. These two pieces 60 and 82 can be integrated together into a single unit to form the seal component 32. For example, the seal component 32 can be formed as part of a two-shot molding process. In such a process, the plastic piece 82, including the central wall 46 can be molded in a first shot, and then the seal piece 60 can be over-molded onto the plastic piece 82.

Figure 13:
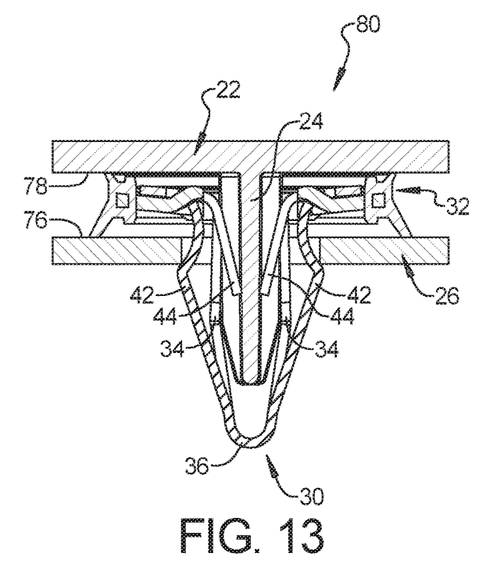
FIG. 13 is a cross-section view similar to FIG. 11 of the coupling assembly of FIG. 1 with the coupling assembly and the dual component sealing fastener in a shipping configuration.
Figure 14:
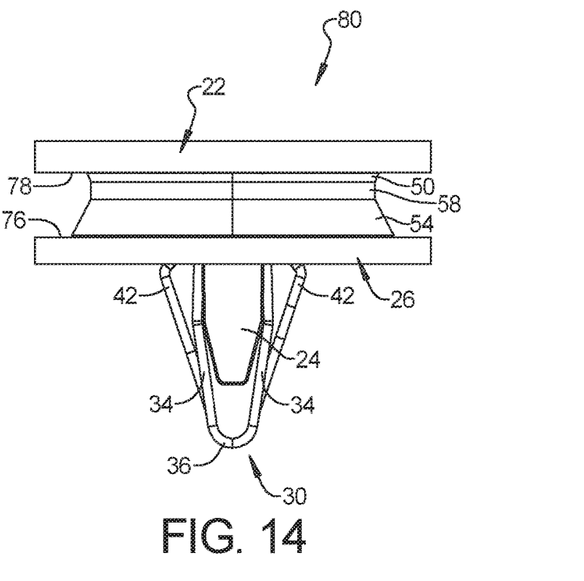
FIG. 14 is a lateral side elevation view similar to FIG. 12 of the coupling assembly of FIG. 8 with the coupling assembly and the dual component sealing fastener in a shipping configuration.

In general, the seal component 32 and the U-base clip component 30 can be coupled together in a shipping configuration shown in FIGS. 9-12 substantially as previously described herein. Similarly, the dual component sealing fastener 20 can be a sub-assembly or part of a coupling assembly 80 having a coupling configuration in which the first component 22 is coupled to the second component 26 as shown in FIGS. 13 and 14 substantially as previously described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A dual component sealing fastener designed to couple a first component having a rib to a second component having an aperture therethrough comprising:
   a U-base clip component comprising:
      two opposing side walls joined together at an insertion end with a rib receiving cavity between the two opposing side walls, and each of the two opposing side walls including a trailing end opposite the insertion end;

a pair of aperture retention arms extending outwardly from the two opposing side walls, respectively; and a pair of rib coupling arms extending inwardly from the two opposing side walls; and a seal component comprising:

a central wall having a clip aperture therethrough;

a first component annular seal extending in a first direction away from a first side of the central wall; and a second component annular seal extending in a second direction away from a second side of the central wall opposite the first direction and opposite the first side, respectively; and wherein the seal component and the U-base clip component have a shipping configuration in which the U-base clip component extends through the clip aperture with the seal component coupled between the trailing ends and the aperture retention arms of the U-base clip component.

2. The dual component sealing fastener of claim 1, wherein the trailing ends of the two opposing side walls resist decoupling of the seal component from the U-base clip component away from the insertion end and the pair of aperture retention arms resist decoupling toward the insertion end in the shipping configuration.

3. The dual component sealing fastener of claim 1, wherein the pair of aperture retention arms are biased against the seal component to resist decoupling of the seal and U-base clip components from each other in the shipping configuration.

4. The dual component sealing fastener of claim 1, wherein the seal component includes a pair of clip coupling protrusions around which the trailing ends are hooked to resist decoupling of the seal component from the U-base clip component away from the insertion end in the shipping configuration.

5. The dual component sealing fastener of claim 4, wherein free distal ends of the pair of aperture retention arms are positioned to engage against the clip coupling protrusions, respectively, to resist decoupling of the seal component from the U-base clip component toward the insertion end in the shipping configuration.

6. The dual component sealing fastener of claim 1, wherein each trailing end of the each of the opposing side walls of the U-base clip component comprise an outwardly extending flange.

7. The dual component sealing fastener of claim 6, wherein the outwardly extending flanges are positioned adjacent a surface of the central wall of the seal component facing away from the insertion end, and a free distal end of the aperture retention arms are positioned adjacent a surface of the central wall of the seal component facing toward the insertion end in the shipping configuration.

8. The dual component sealing fastener of claim 7, wherein a recess provides the surface of the central wall of the seal component facing toward the insertion end in the shipping configuration.

9. The dual component sealing fastener of claim 1, wherein the first component annular seal, the second component annular seal, and the central wall are all part of a single piece component of a seal material.

10. The dual component sealing fastener of claim 9, wherein an annular recess extends around the outside of the single piece component between the first component annular seal and the second component annular seal.

11. The dual component sealing fastener of claim 1, wherein the first component annular seal and the second component annular seal are both part of a single piece component formed of a seal material.

12. The dual component sealing fastener of claim 11, wherein an annular recess extends around the outside of the single piece component between the first component annular seal and the second component annular seal.

13. The dual component sealing fastener of claim 12, wherein the central wall is formed of a plastic material that is harder than the seal material.

14. The dual component sealing fastener of claim 1, wherein the first component annular seal and the second component annular seal of the seal component are formed of a seal material, and the central wall is formed of a plastic material that is harder than the seal material.

15. The dual component sealing fastener of claim 1, wherein the seal component is symmetrical about a central transverse plane.

16. The dual component sealing fastener of claim 1, wherein the seal component and the U-base clip component are designed to couple the first component to the second component in a coupling configuration in which the aperture retention arms are biased against the second component resulting in the aperture retention arms being spaced away from the seal component.

17. A dual component sealing fastener designed to couple a first component having a rib to a second component having an aperture therethrough comprising:

a U-base clip component comprising:

two opposing side walls joined together at an insertion end with a rib receiving cavity between the two opposing side walls, and each of the two opposing side walls including an outwardly extending flange at a trailing end opposite the insertion end; and a pair of aperture retention arms extending outwardly from the two opposing side walls, respectively; and a pair of rib coupling arms extending inwardly from the two opposing side walls; and a seal component comprising:

a central wall having a clip aperture therethrough; and a first component annular seal extending in a first direction away from a first side of the central wall; and a second component annular seal extending in a second direction away from a second side of the central wall opposite the first direction and opposite the first side, respectively; and wherein the seal component and the U-base clip component have a shipping configuration in which the U-base clip component extends through the clip aperture and is coupled to the seal component with the outwardly extending flanges positioned adjacent a surface of the central wall of the seal component facing away from the insertion end, and the aperture retention arms being biased against the seal component and a free distal end of the aperture retention arms positioned adjacent a surface of the central wall of the seal component facing toward the insertion end.

18. The dual component sealing fastener of claim 17, wherein the first component annular seal and the second component annular seal are both part of a single piece component formed of seal material.

19. The dual component sealing fastener of claim 18, wherein an annular recess extends around the outside of the single piece component between the first component annular seal and the second component annular seal.

20. The dual component sealing fastener of claim 18, wherein the central wall is part of the single piece component of seal material.

21. The dual component sealing fastener of claim 17, wherein the seal component is symmetrical about a central transverse plane.

22. A coupling assembly comprising:
- a first component having a coupling rib and a first component sealing surface surrounding the coupling rib; and
- a second component having a coupling aperture therethrough and a second component sealing surface surrounding the coupling aperture; and
- a seal component including a central wall having a clip aperture therethrough, a first component annular seal extending away from a trailing side of the central wall in a trailing direction, and a second component annular seal extending away from an insertion side opposite the trailing side of the central wall in an insertion direction opposite the trailing direction; and
- a U-base clip component including two opposing side walls joined together at an insertion end with a rib receiving cavity between the two opposing side walls, and each of the two opposing side walls including a trailing end opposite the insertion end, a pair of aperture retention arms extending outwardly from the two opposing side walls, respectively, and a pair of rib coupling arms extending inwardly from the two opposing side walls; and
- wherein the coupling assembly has a coupling configuration in which the U-base clip component extends through the clip aperture of the seal component and through the coupling aperture of the first component with the aperture retention arms retaining the second component annular seal against the second component sealing surface and in which the coupling rib extends into the rib receiving cavity with the rib coupling arms retaining the first component annular seal against the first component sealing surface so the first and second component sealing surfaces are sealed together around both the coupling aperture of the first component and the clip aperture of the sealing component.

23. The coupling assembly of claim 22, wherein in the coupling configuration the aperture retention arms are biased against the second component resulting in the aperture retention arms being spaced away from the seal component.

24. The coupling assembly of claim 22, wherein a sub-assembly comprising the U-base clip component and the U-base clip component has a shipping configuration in which the U-base clip component extends through the clip aperture with the seal component coupled between the trailing ends of the U-base clip component.

25. The coupling assembly of claim 22, wherein a sub-assembly comprising the U-base clip component and the U-base clip component has a shipping configuration in which the U-base clip component extends through the clip aperture with the seal component coupled between the trailing ends of the U-base clip component with the aperture retention arms biased against the seal component in the shipping configuration of the sub assembly, and wherein the aperture retention arms are biased against the second component resulting in the aperture retention arms being spaced away from the seal component in the coupling configuration.

* * * * *